Oct. 21, 1958
G. H. MacDONALD
2,856,690
LIQUID LEVEL GAUGE
Filed July 26, 1957
2 Sheets-Sheet 1
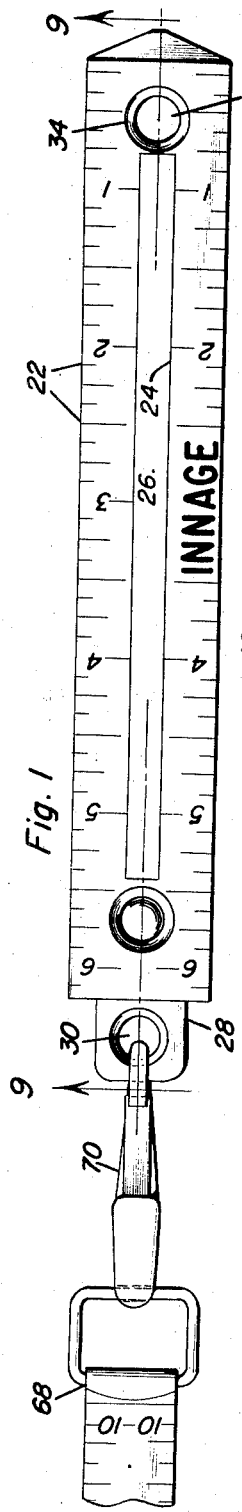
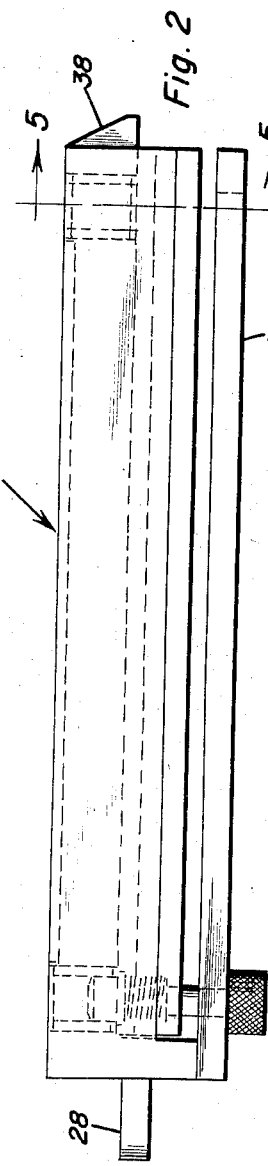
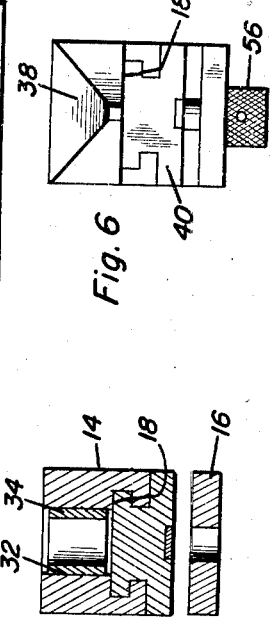
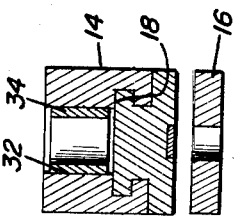
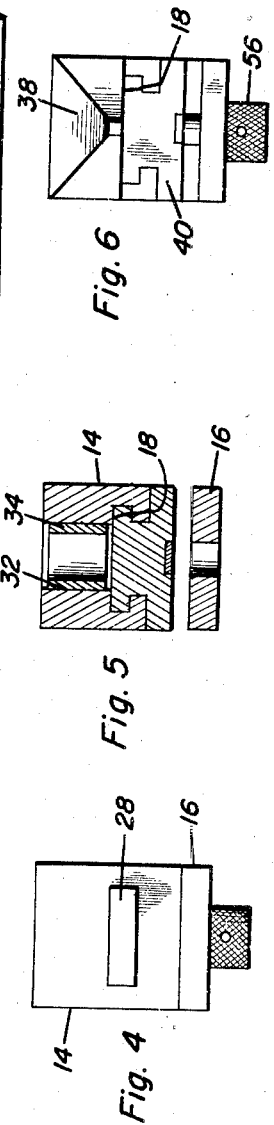
George H. MacDonald
INVENTOR.
BY *Clarence A. O'Brien*
*and Harvey B. Jacobson*
Attorneys Oct. 21, 1958 G. H. MacDONALD 2,856,690
LIQUID LEVEL GAUGE
Filed July 26, 1957 2 Sheets-Sheet 2
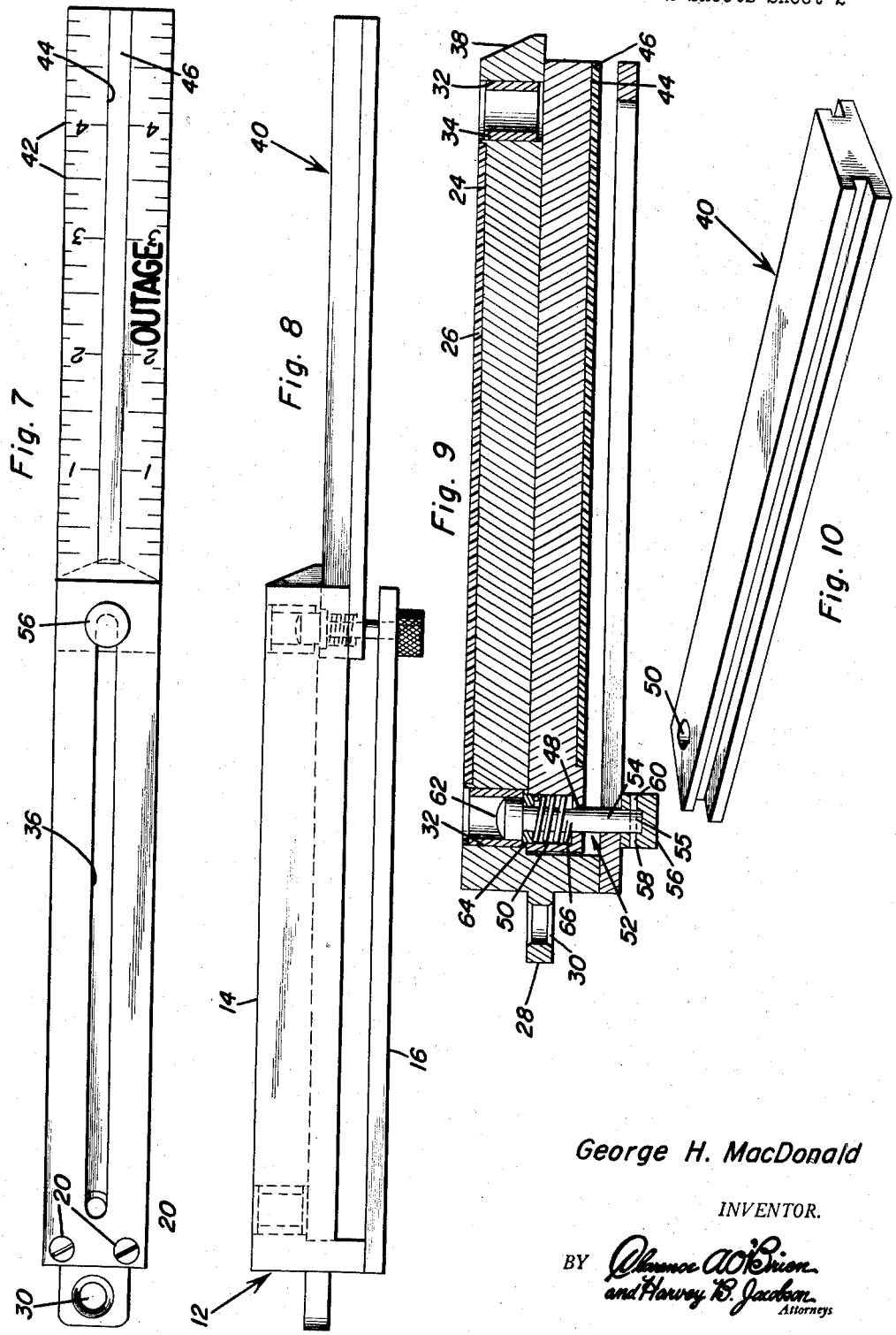
George H. MacDonald
INVENTOR.

United States Patent Office 2,856,690
Patented Oct. 21, 1958

2,856,690

LIQUID LEVEL GAUGE

George H. MacDonald, Bayonne, N. J.

Application July 26, 1957, Serial No. 674,472

1 Claim. (Cl. 33—126.5)

This device pertains generally to a gauge for checking the height of liquid in a tank, and more specifically to a combination gauge which may take two types of liquid height measurements in a tank.

In fields where it is necessary to measure or gauge the level of liquid in a tank, two types of such measurement have developed. They have come to be known, to people familiar with this art, as innage and outage measurements. The outage measurement is taken by securing a bob to an outage tape, lowering this bob until it just touches the surface of liquid in a tank, and then a direct reading on the tape may be taken of the height of liquid in the tank which has already been removed from this tank. If the height of the liquid remaining in the tank is desired to be determined, it becomes necessary to subtract this outage height from the total height of the tank, and the result obtained is called the innage measurement. In order to find the innage measurement of a tank directly, a bob is secured to an innage tape and then lowered into the tank, until the bob reaches the bottom of the tank, and then a direct reading is taken on the tape which is the innage measurement of the tank. Therefore, the primary purpose of this invention is to provide a gauge which when secured to the ends of a tape will be capable of giving both innage and outage measurements.

Another object of this invention is to provide an innage-outage gauge which will be simple to use and easy to read.

A further object of this invention is to provide a gauge which may be used for measuring liquid levels in tankers, barges, shore tanks, or any other type of container holding petroleum or other liquids.

These together with other objects and advantages which will become subsequently apparent reside in its details of construction and operation as more fully hereinafter described and claimed, reference being had to the accompanying drawings forming a part hereof, wherein numerals refer to like parts throughout, and in which:

Figure 1 is a top elevational view showing the gauge attached to an innage tape;

Figure 2 is a side elevational view showing the relation of the various parts of the gauge;

Figure 3 is a bottom elevational view illustrating details of construction therein;

Figure 4 is an end elevational view as seen from the left side of Figure 2;

Figure 5 is a vertical sectional view taken substantially along reference line 5—5 of Figure 2 and illustrating further details of construction;

Figure 6 is an end elevational view looking from the right side of Figure 2;

Figure 7 is a view similar to that of Figure 3 showing the gauge in its extended position;

Figure 8 is a view similar to that of Figure 2 also showing the gauge in its extended position;

Figure 9 is a horizontal cross sectional view taken substantially along the reference line 9—9 of Figure 1 further showing details of construction of the gauge; and Figure 10 is a perspective view of the slide portion of the gauge.

Referring now more particularly to the drawing, reference numeral 10 generally indicates the gauge comprising the present invention. This gauge consists of a housing 12 which is constructed in two parts. This housing 12 has a face portion 14 and a back portion 16. An undercut channel 18 is formed on that part of the face portion 14 which opposes back portion 16. The face and back portions 14 and 16, respectively, are secured together by means of bolts 20 which extend through the back portion 16 and are threadingly engaged into face portion 14 in any suitable manner (not shown). Coming back now to the face portion 14, it may be seen from an inspection of Figure 1, that the top of this face portion is provided with suitable indicia 22 for use as an innage gauge. The top portion of the face 14 is provided a longitudinally extending slot 24 into which is fitted a Bakelite strip 26 which strip serves to more clearly indicate the liquid level. On one end of the housing 12 extends a supporting lug 28 which is provided with a hole 30. Openings 32 are provided in either end of the face portion into which are fitted bushings 34.

Referring now to the back 16 of the housing this consists of a flat bar having a longitudinally extending slot 36 therein. When the face and back 14 and 16 are joined together to form the housing 12, this housing consists generally of a U-shaped portion having an extending lug projecting out of the bight portion. It is to be noted that the face 14 has an extending bob portion 38 which extends out slightly further than the end of back portion 16.

Into the channel 18 of the housing 12 is slidably secured a slide generally indicated by the numeral 40. This slide 40 has a cross section generally resembling a horizontal H. Indicia 42 are provided on one surface of the slide 40. These indicia generally resemble those which can be found on an outage bob. A slot 44 is provided in the slide on the same side that has the indicia 42 on it, and provided in the slide is a strip of Bakelite 46 similar to strip 26 and used for the same purpose. Provided in one end of the slide is an opening 48 which communicates with a larger opening 50.

The slide 40 is slidingly positioned in the channel 18 and secured therein by means of a pin 52 which will now be described. Pin 52 comprises a shaft 54 which is inserted into opening 48, and opening 55 is formed through one end of shaft 54. This end extends out through slot 36 and has a head 56 mounted thereon. This head is made with a knurled surface so as to make it easier to grip. An opening 58 is provided in this head, and openings 55 and 58 are aligned so as to accommodate a key pin 60 which will lock the head 56 to the shaft 54. A knob 62 is formed on the other end of shaft 54. This knob 62 extends into one of the previously mentioned bushings 34. A washer 64 is loosely provided about shaft 54 between the knob 62 and a spring 66. This coil compression spring 66 encircles shaft 54 and it is engaged between the bottom of the larger opening 50 in the slide and the washer 64, thus spring urging knob 62 into bushing 34.

The centers of openings 32 are aligned with the longitudinal axis of slot 36 whereby the pin 52 may extend through the slot and into one of the openings. The arcuate ends of slot 36 act as limiting abutments for the pin, and in the limited positions the pin will be aligned with one of the openings 32. It is pointed out that in the retracted position there is a space between one end of slide 40 and face portion 14 of the housing, as can be seen in Figure 9, so that any foreign matter that may accumulate will not affect the use of the gauge.

As just described, the slide is in its inner position in the housing 12, but the slide may be easily extended in a fashion to be explained hereinafter. The head 56 of the pin 52 is made so that it is slightly larger than slot 36 and although the pin is spring urged inwardly towards bushing 34, the head 56 acts on the edges of the slot 36 as a limiting stop. To move the slide into its extended position, it is merely necessary to pull on the head 56 so as to move the knob 62 clear of the bushing 34, and the slide may now be longitudinally extended until it reaches a position as seen in Figures 7 and 8 in which the knob 62 becomes located into the other bushing 34.

In use, an innage tape 68 with a snap hook 70 secured thereon, will engage the opening 30 of the extended lug. Now if an innage reading is desired, it is merely necessary to lower the gauge while the slide is retracted into a tank until the bob portion 38 reaches the lower surface of the tank, and the innage may now be read directly either on the gauge or on the innage tape. On the other hand, if an outage reading is desired, it is merely necessary to pull the slide out to its extended position and then lower the gauge into the tank until one end of the outage slide 40 reaches or extends slightly below the upper surface of the liquid. The outage reading may now be found by reading the outage slide, adding this to the reading obtained by aligning a reference point on the tank, with the tape. It is to be noted that when the slide is in its retracted position the outage indicia is concealed by back portion 16, thus minimizing the possibility of an error caused by reading the wrong indicia on the gauge.

The foregoing is considered as illustrative only of the principles of the invention. Further, since numerous modifications and changes will readily occur to those skilled in the art, it is not desired to limit the invention to the extact construction and operation shown and described, and accordingly all suitable modifications and equivalents may be resorted to, falling within the scope of the appended claim.

What is claimed as new is as follows:

The combination of a tape, a hook, and a combined innage and outage gauge whereby said gauge comprises a housing having a face and back, a channel formed in said housing, a slide having a face and back adapted to be inserted into said channel, said housing having indicia suitable for innage measurement on the face of the housing, said slide having indicia suitable for liquid level measurement on the face of the slide, means on said slide for adjustably locking said slide into a retracted or an extended position, said retracted position adapting the gauge for innage measurement and said extended position adapting said gauge for outage measurement, a lug extending from one end of the housing having an opening formed therein, said hook connecting said tape and said gauge whereby said tape and said gauge may be used in conjunction with each other.

References Cited in the file of this patent
UNITED STATES PATENTS

| | | |
|---|---|---|
| 595,475 | Hegarty | Dec. 14, 1897 |
| 909,068 | Denman et al. | Jan. 5, 1909 |
| 2,200,630 | McCabe | May 14, 1940 |
| 2,648,133 | Kosmoski et al. | Aug. 11, 1953 |

FOREIGN PATENTS

| | | |
|---|---|---|
| 457,894 | France | July 24, 1913 |